H. W. AND C. J. SCHAUMBURG.
TRUCK.
APPLICATION FILED JUNE 3, 1918.

1,334,559. Patented Mar. 23, 1920.

Harm W. Schaumburg
Carl J. Schaumburg
Inventors.

By *[signature]*
Attorneys

UNITED STATES PATENT OFFICE.

HARM W. SCHAUMBURG AND CARL J. SCHAUMBURG, OF MILFORD, ILLINOIS.

TRUCK.

1,334,559. Specification of Letters Patent. Patented Mar. 23, 1920.

Application filed June 3, 1918. Serial No. 238,023.

*To all whom it may concern:*

Be it known that we, HARM W. SCHAUMBURG and CARL J. SCHAUMBURG, citizens of the United States, residing at Milford, in the county of Iroquois and State of Illinois, have invented new and useful Improvements in Trucks, of which the following is a specification.

This invention relates to harrow carts whereby a riding attachment for the implement is had.

The invention has for its object to provide a simple and efficient device of the kind stated, and to this end it consists in a novel combination and arrangement of parts to be hereinafter described and claimed.

In order that the invention may be better understood, reference is had to the accompanying drawing forming a part of this specification, in which—

Figure 1:
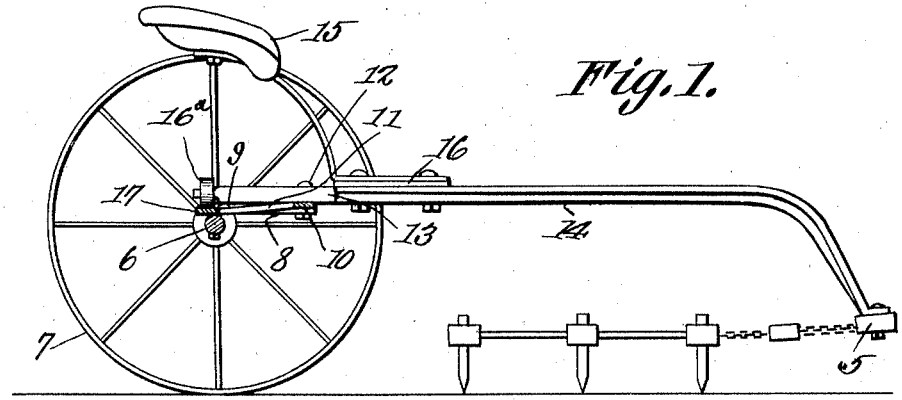
Figure 1 is a side elevation of the cart partly in section.
Figure 2:
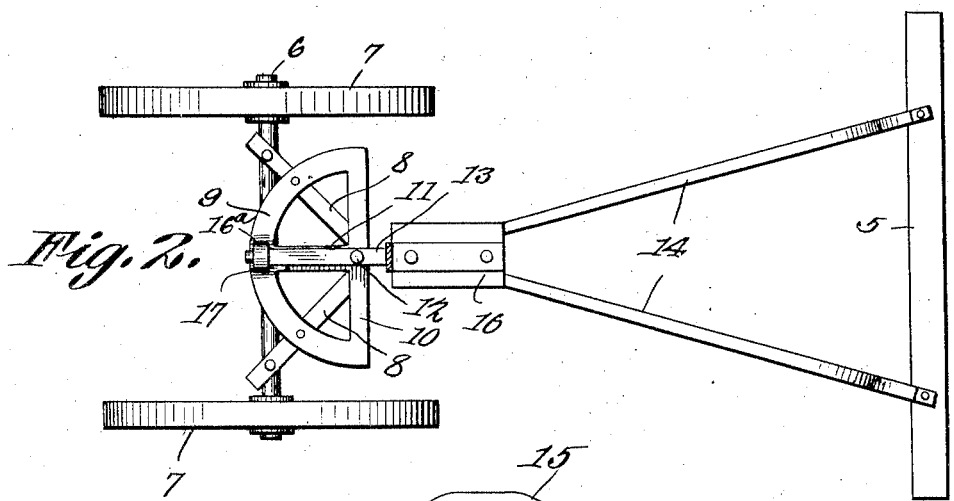
Fig. 2 is a plan view thereof with the seat broken away.
Figure 3:
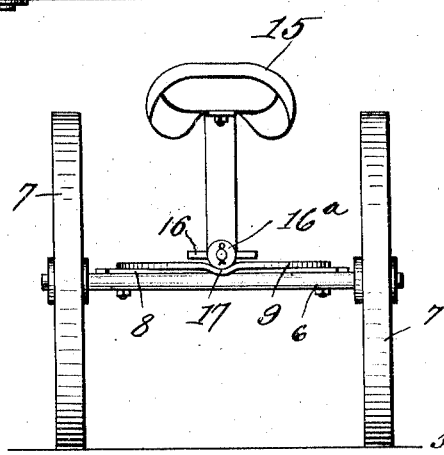
Fig. 3 is an end view.

Referring specifically to the drawings 5 denotes a fragment of the drawbar of a harrow. In order to provide a support for the drawbar when the machine is in use, there is provided a wheeled supporting frame or truck which is detachably connected to the harrow drawbar. This truck is composed of the following parts:

On an axle 6 are journaled two ground wheels 7. To the axle are rigidly fastened two forwardly extending and converging brace bars 8 supporting a sector plate 9 connected at its ends by a transverse bar 10 between which latter and the plate 9, a longitudinal bar 11 extends. These parts are rigidly connected, and the plate 9 forms a turn plate or fifth wheel.

On a bolt 12 passing vertically through the bar 10, midway between the ends thereof, is pivoted a supporting bar 13 for the harrow, said bar being provided with forwardly extending diverging branches 14 which are connected to the draw bar 5 in any suitable manner.

The supporting bar 13 also carries a seat 15 for the driver, and a foot rest 16.

The rear end of the bar 13 extends over as far as the plate 9 and carries at its outer end a roller 16ª adapted to seat in a depression 17 in the center of said bar so as to keep the device steady when driving straight ahead. When a turn is being made, the roller rides out of the depression and rolls along the bar 9, and when a straight ahead course is again reached, it drops back into the depression. It will be understood that the pivoted connection of the bar 13 will be sufficiently loose to allow the roller to drop into the depression and to rise out of the same. This loose connection also enables the wheeled frame to tilt relative to the bar 13 and the parts associated therewith which are connected to the draw bar 5, and as the seat 15 is supported solely by the bar 13, it will be evident that the seat remains upright at all times and does not tilt sidewise when one side of the wheeled frame drops or rises as when passing into a depression or over an obstruction.

We claim:

A harrow cart comprising an axle, ground wheels supporting the axle, a pair of forwardly extending and converging brace bars fastened to the axle, a sector plate rigidly fastened to said bars and having a front cross bar, a harrow supporting bar seating slidably on the sector plate, a pivot bolt passing loosely through said supporting bar and the cross bar intermediate the ends of the latter, and a seat carried by the supporting bar.

In testimony whereof we affix our signatures.

HARM W. SCHAUMBURG.
CARL J. SCHAUMBURG.